(12) United States Patent
Carlden (10) Patent No.: US 11,702,146 B2
(45) Date of Patent: Jul. 18, 2023

(54) VEHICLE BODY ELEMENT CONNECTING JOINT

(71) Applicant: Volvo Bus Corporation, Gothenburg (SE)

(72) Inventor: Lars Carlden, Alafors (SE)

(73) Assignee: Volvo Bus Corporation, Gothenburg (SE)

(*) Notice: Subject to any disclaimer, the term of this patent is extended or adjusted under 35 U.S.C. 154(b) by 106 days.

(21) Appl. No.: 17/611,935

(22) PCT Filed: May 21, 2019

(86) PCT No.: PCT/EP2019/063052
§ 371 (c)(1),
(2) Date: Nov. 17, 2021

(87) PCT Pub. No.: WO2020/233790
PCT Pub. Date: Nov. 26, 2020

(65) Prior Publication Data
US 2022/0227431 A1  Jul. 21, 2022

(51) Int. Cl.
*B62D 31/02* (2006.01)
*B62D 27/02* (2006.01)
(Continued)

(52) U.S. Cl.
CPC ......... *B62D 31/025* (2013.01); *B62D 27/065* (2013.01); *B60G 2206/011* (2013.01);
(Continued)

(58) Field of Classification Search
CPC .... B62D 31/025; B62D 31/02; B62D 33/046; B62D 27/065; B62D 27/023
(Continued)

(56) References Cited

U.S. PATENT DOCUMENTS

| 4,469,369 A | 9/1984 | Belik et al. |
| 5,553,906 A | 9/1996 | Kunz |

(Continued)

FOREIGN PATENT DOCUMENTS

| DE | 3414617 A | * 10/1985 | ........... B62D 47/006 |
| EP | 0818373 A2 | 1/1998 | |

(Continued)

OTHER PUBLICATIONS

International Search Report and Written Opinion for International Patent Application No. PCT/EP2019/063052, dated Feb. 17, 2020, 11 pages.

*Primary Examiner* — Dennis H Pedder
(74) *Attorney, Agent, or Firm* — Withrow & Terranova, PLLC (57) ABSTRACT

The disclosure relates to a vehicle body element connecting joint for connecting a first body element to a second body element, which connecting joint comprises first and second elongate profiles arranged along adjacent edges of the first and second body elements, respectively. The connecting joint comprises a first projection protruding from the first elongate profile parallel to a side surface of the first elongate profile and extending towards a free end of the first elongate profile, a first recess arranged in a side surface of the second elongate profile and arranged parallel to an edge of the second elongate profile, wherein the first projection is inserted into the first recess. A first and second dovetail section protrude from the first and second elongate profile, respectively At least one fastening strip contacts the first and second dovetail sections to clamp the first and second elongate profiles to each other.

11 Claims, 6 Drawing Sheets

(51) Int. Cl.
*B62D 27/06* (2006.01)
*B62D 33/04* (2006.01)

(52) U.S. Cl.
CPC ........ *B60G 2300/14* (2013.01); *B62D 27/023* (2013.01); *B62D 33/046* (2013.01)

(58) Field of Classification Search
USPC ............ 296/26.01, 8, 11, 193.01, 3, 4, 9, 29
See application file for complete search history.

(56) References Cited

U.S. PATENT DOCUMENTS

| | | | | |
|---|---|---|---|---|
| 6,896,319 | B1 * | 5/2005 | Huang | B62D 25/02 |
| | | | | 296/193.06 |
| 7,216,911 | B2 * | 5/2007 | Andre | B62D 33/08 |
| | | | | 280/638 |
| 11,338,864 | B2 * | 5/2022 | Carlden | B62D 27/023 |

FOREIGN PATENT DOCUMENTS

| | | | | | |
|---|---|---|---|---|---|
| EP | | 1931494 B1 * | 3/2012 | ........... | B23K 20/122 |
| FR | | 2828914 A1 | 2/2003 | | |
| WO | WO-2007039073 A1 * | | 4/2007 | ........... | B23K 20/122 |
| WO | | 2018228688 A1 | 12/2018 | | |

\* cited by examiner

VEHICLE BODY ELEMENT CONNECTING JOINT

This application is a 35 USC 371 national phase filing of International Application No. PCT/EP2019/063052, filed May 21, 2019, the disclosure of which is incorporated herein by reference in its entirety.

TECHNICAL FIELD

The invention relates to a vehicle body element connecting joint for connecting a first body element to a second body element of a vehicle module, during assembly of multiple connected body elements to form a vehicle module.

BACKGROUND OF THE INVENTION

In the production of passenger transport vehicles or commercial vehicles in general there is a desire to produce several versions of such vehicle based on the same basic layout. The different versions can have different lengths, passenger capacity and/or load-carrying capacity. Typical examples of such vehicles are buses of an original single-unit structure based on chassis units of trucks. However, the principle is also applicable to trucks, for instance when assembling different sizes of drivers cabs or load carrying compartments.

U.S. Pat. No. 4,469,369 shows examples of module elements used for the assembly of a city motor bus or similar vehicle. In this case, a module comprising a transverse window section of the body open at the end portions is assembled end to end with adjacent modules comprising front and rear modules to form a complete vehicle. Such design makes it possible to assemble bodies of different lengths in the same assembly jig and to widely apply automatic welding.

EP0818373 shows an alternative method of assembling module elements, wherein welding can be replaced by a joint comprising locking wedges and fasteners for clamping facing edges of two modules together. In a vehicle assembled from such module elements, the parts and assemblies of the vehicle body can be assembled and subsequently replaced if necessary.

A problem with the above solutions is that the connecting joints used for connecting body elements can often be difficult to assemble. In addition, the assembled connecting joints may create undesired local force concentrations and/or may be unable to keep the body elements tightly clamped together over time.

The object of the invention is to provide an improved connecting joint, in particular a corner joint, for joining vehicle body elements of different types or versions that solves the above problems and facilitates the assembly of such body elements.

INVENTION

The above problems have been solved by a connecting joint as claimed in the appended claims.

In the subsequent text, the term "vehicle module" is intended to describe an individual vehicle module that can be connected to at least one other vehicle module. Two or more vehicle modules are assembled to make a complete vehicle. In the case of a passenger transport vehicle, such as a bus, vehicle modules can comprise a front driver's cab module, a rear drive module, and one or more intermediate passenger compartment modules having window and/or doors. Each vehicle module comprises a number of vehicle body elements, such as an upper element, a lower element and two side elements connectable to corresponding body elements on an adjacent vehicle module. These elements will be referred to as "body elements". When assembled, body elements in the form of a roof, a floor and two side walls will form a vehicle module.

A body element connecting joint can be used for connecting one or more body elements to form a vehicle module. The invention relates to one such connecting joint between adjacent body elements. In the subsequent text, the body element connecting joint described to is a generic joint suitable for use in any one of the upper elements, lower elements and side elements to be joined. The connecting joint is preferably a corner joint, wherein two adjacent elements will be arranged at or approximately at right angles to each other.

In the subsequent text, body element connecting joint is described in connection with a body module suitable for passenger vehicles, such as buses. The reason for this is to maintain a consistent set of reference terms for accurately describing the form and function of the body element connecting joint. However, the use of the body element connecting joint is not limited for use in buses or as a joint only arranged in the longitudinal direction of a vehicle. Alternative uses for the body element connecting joint track-bound vehicles, such as trams and trolley cars or load carrying vehicles such as trucks. In the latter case, a load carrying compartment could be designed using the inventive body element connecting joint in any longitudinal, transverse and vertical corner to build a box-shaped load compartment.

The assembled body elements can be arranged to form a portion of a side wall section, a roof or ceiling section and/or a floor section. Consequently, the assembled body elements will have an inner surface, an outer surface and a pair of facing side edges. Each side edge is provided with elongate connecting profiles, wherein connected profiles have facing surfaces adjacent the connecting joint and remote surfaces adjacent the respective body module edges. Side surfaces on the profiles are substantially parallel to the inner and/or outer surfaces of the body element to which it is joined. The connected profiles have a longitudinal extension parallel with the longitudinal extension of their respective adjacent body element and the main longitudinal direction of the vehicle. Similarly, the connected profiles have a transverse extension at right angles to their longitudinal extension and in the plane of their respective adjacent body element.

The above terminology and the description of the relative locations of components in a connecting joint between two body elements will be adhered to in the text below.

According to a preferred embodiment, the invention relates to a vehicle body element connecting joint for connecting a first body element to a second body element, which connecting joint comprises first and second elongate profiles arranged along adjacent edges of the first and second body elements, respectively. The connecting joint comprises a first projection protruding from the first elongate profile parallel to a side surface of the first elongate profile and extending towards a free end of the first elongate profile, a first recess arranged in a side surface of the second elongate profile and arranged parallel to an edge of the second elongate profile, wherein the first projection is inserted into the first recess.

The connecting joint further comprises a first dovetail section protruding from the first elongate profile and arranged along the free end of the first elongate profiles and a second dovetail section protruding from the second elongate profile and extending parallel to and out of the free end of the second elongate profile. At least one fastening strip having a profile arranged to contact the first dovetail section and the second dovetail section is provided to clamp the first and second elongate profiles to each other along their adjacent free ends, and at least one fastener is arranged to be inserted through the fastening strip in order to press it towards the first dovetail section and the second dovetail section in order to achieve a clamping force when the joint is tightened by means of the fastener.

The inventive connecting joint comprises elongate profiles arranged along facing edges of the first and second body elements, respectively. The profiles are provided with shaped sections commonly referred to as "dovetails", which sections have their widest cross-sectional dimension facing into the joint. A dovetail joint is also referred to as a swallow-tail joint or a fantail joint. The adjacent profiles are clamped together by locking wedges arranged parallel to the profiles, matching the shape of the dovetail sections. The body modules will inherently have an inner surface and an outer surface, whereby the locking wedges will be arranged along the dovetail sections of said profiles on opposite sides of the inner and outer surfaces of the respective body modules. The locking wedges are connected by fastening means extending between facing profiles on said edges of the first and second body elements. The fastening means can be any suitable type of fastener, such as a screw. The fasteners connecting the locking wedges are arranged at right angles to the facing contact surfaces between the first and second elongated profiles.

According to one example, the connecting joint comprises a first profile arranged along a side edge of the first body module along a surface remote from the connecting joint and a second profile arranged parallel to and in form-fitting contact with the first profile along facing side surfaces; wherein the assembled first and second profiles forming a single, common first dovetail section along a surface facing the connecting joint. In order to achieve this, the first and second profiles are assembled side-by-side and have form-fitting sections facing into the joint which sections are interlocking and shaped to form a single dovetail after assembly of the first and second profiles.

According to one example, the first and second elongated profiles of the connecting joint are joined along facing contact surfaces, wherein a first contact surface extends parallel to the side surface along the first elongate profile and a second contact surface comprises an end surface along the second elongate profile facing the first elongate profile. In this example, the first projection and the first recess are separated from the first and second dovetail sections, respectively, by the facing contact surfaces between the first and second elongated profiles. The first projection and the first recess are located on the opposite side of a plane coinciding with the assembled contact surfaces relative to the first and second dovetail sections.

According to a further example, the first projection of the first elongate profile and the first recess of the second elongate profile comprise complementary beveled surfaces arranged to force the first and second elongated profiles together when the joint is tightened with the fastener. The fastener is arranged to be threaded into a corresponding threaded recess in the end surface of the second elongate profile through the fastening strip in order to press the fastening strip towards the first and second dovetail sections. The number of fasteners used and the spacing between adjacent fasteners is dependent on factors such the length of the profiles making up the connecting joint and the required strength of the connecting joint.

According to a further example, the fastener is a tapping screw arranged to be threaded into a longitudinal slot along the end surface of the second elongate profile. In this way, there is no need for exactly positioned threaded recesses in the end surface of the second elongate profile. The number of fasteners is determined by a predetermined number of holes provided for fasteners through the fastening strip. The longitudinal slot parallel to the edge along the end surface of the second elongate profile allows fasteners to be located at any position. Fasteners are inserted through the holes in the fastening strip and will create their own threads as they are screwed into the slot to clamp the fastening strip in position.

According to the invention, the contacting portions of the first and second elongated profiles allows the elongated profiles to form a corner joint, along which corner the first and second body elements are connected to form a vehicle module. Additional corner joints can be used along two or more longitudinal corners of the vehicle module in order to connect at least three of the body elements making up a vehicle module.

According to a further example, the fastening strip and the at least one fastener are covered by an elongated cover profile hooked into a recess in the first elongated profile and snapped over a side edge of the fastening strip. The cover profile can have a substantially L-shaped cross-section. Along a first free end the cover profile can be provided with a curved attachment section, which is inserted into a similarly curved, form-fitting slot in the outer side surface of and adjacent the free end of the first elongate profile. Both the curved slot and the curved attachment section preferably have a part-circular cross-section. Along a second free end the cover profile can be provided with a hook-shaped locking section. When the curved attachment section is inserted in the curved slot, the cover profile can be rotated about a pivot axis created by the part-circular shape of the curved slot. In a final step, the cover profile is fixed into position by snapping the locking section over a longitudinal edge of fastening strip remote from the free end of the first elongate profile.

The invention is not limited to the above examples describing the cover. For instance, the locking section can be snapped into a longitudinal recess in the outer side surface of the second elongate profile. Alternatively, the locking section can be snapped over a longitudinal projection extending along the outer side surface of the second elongate profile. Further, at the first free end the cover profile can be provided with an attachment section having alternatively shaped cross-sections, suitable for insertion into a similarly shaped, form-fitting slot in the outer side surface of and adjacent the free end of the first elongate profile. Consequently, the attachment section can have a cross-section that is curved, L-shaped, V-shaped, as long as it is suitable for hooking into or otherwise cooperating with a corresponding slot or groove in the outer side surface of the first elongate profile.

The substantially L-shaped cover profile can be an optional component provided to protect the connecting joint from physical damage as well as from dirt and humid conditions. This is an advantage when the body elements and the connecting joint form an integral part of the visible outer skin of a body module.

The invention further relates to a vehicle comprises vehicle body modules assembled by means of connecting joints according to the above description.

In the production of passenger transport vehicles or commercial vehicles in general there is a desire to produce several versions of such vehicle based on the same basic layout. The different versions can have different lengths, passenger capacity and/or load-carrying capacity. Typical examples of such vehicles are buses of an original single-unit structure based on chassis units of trucks. However, the principle is also applicable to trucks, for instance when assembling different sizes of drivers cabs or load carrying compartments. The connecting joint according to the invention is particularly advantageous for such applications. A connecting joint according to the invention can be used for exchangeable body elements, which allows the same connecting joint to be applied to any number of body element and/or body module combinations.

In the above-mentioned text, the first and second profiles are provided with individual dovetail sections and with individual mating wedge sections. This arrangement allows a single fastener strip to be used, which reduces material cost weight and time for assembly. The invention provides a modular system that eliminates the need for manufacturing special profiles for each joint. Wall panels, floor panels and roof panels comprising standard elongate profiles can thereby be assembled and form part of the body module without requiring any modifications. The inventive body element connecting joint can therefore be used in any longitudinal, transverse and vertical corner to build anything from body modules for buses to box-shaped load compartments for trucks. A further advantage is that the connecting joint that has a transverse dimension allowing fasteners to be pre-loaded. Such a pre-load acting on the compressed joint components provides external tension loads with a path through the joint other than through the fastener, thus reducing the fatigue loading on the fastener. Pre-loading also improves the durability of the fastener under repeated loading, which is a common loading case in vehicles.

FIGURES

In the following text, the invention will be described in detail with reference to the attached drawings. These schematic drawings are used for illustration only and do not in any way limit the scope of the invention. In the drawings.

DETAILED DESCRIPTION

Figure 1:
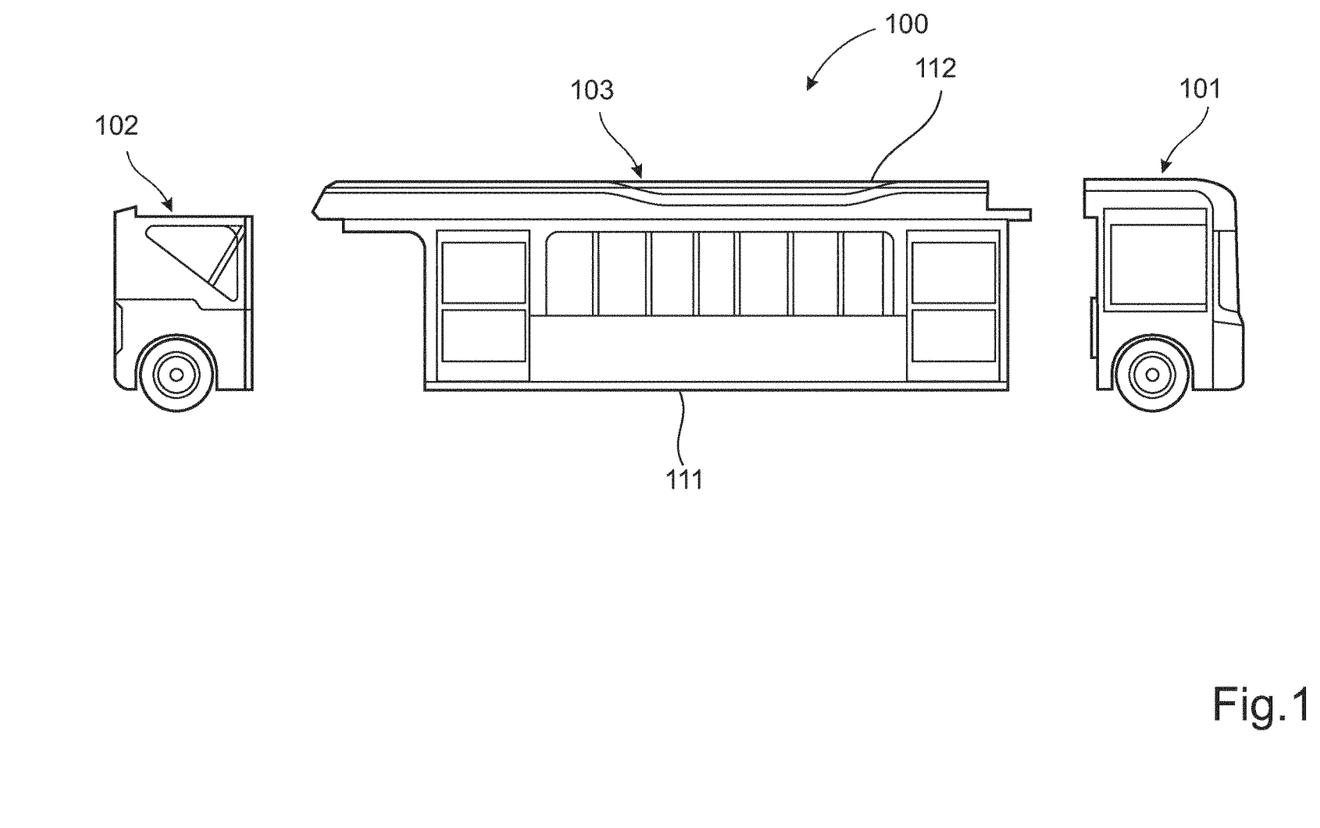
FIG. 1 shows a schematic vehicle comprising body elements with connecting joints according to the invention.

FIG. 1 shows a schematically illustrated vehicle 100 comprising body elements to be assembled using connecting joints according to the invention. The vehicle 100 in this example will comprise a front vehicle module 101, such as a driver's cab module, a rear vehicle module 102, such as a drive module comprising a propulsion unit, and an intermediate vehicle module 103, such as a passenger module having windows and doors, to form a complete vehicle 100.

At least the intermediate vehicle module 103 can be assembled from body elements making up roof, floor and side elements. In the intermediate vehicle module 103 shown in FIG. 1, connecting joints 111, 112 according to the invention are used to assemble adjacent body elements in the longitudinal direction of the vehicle. Further, adjacent side edges of body elements on the front and rear vehicle modules 101, 102 can be provided with such connecting joints in both the longitudinal and the transverse direction of the vehicle, as will be described below.

Figure 2:
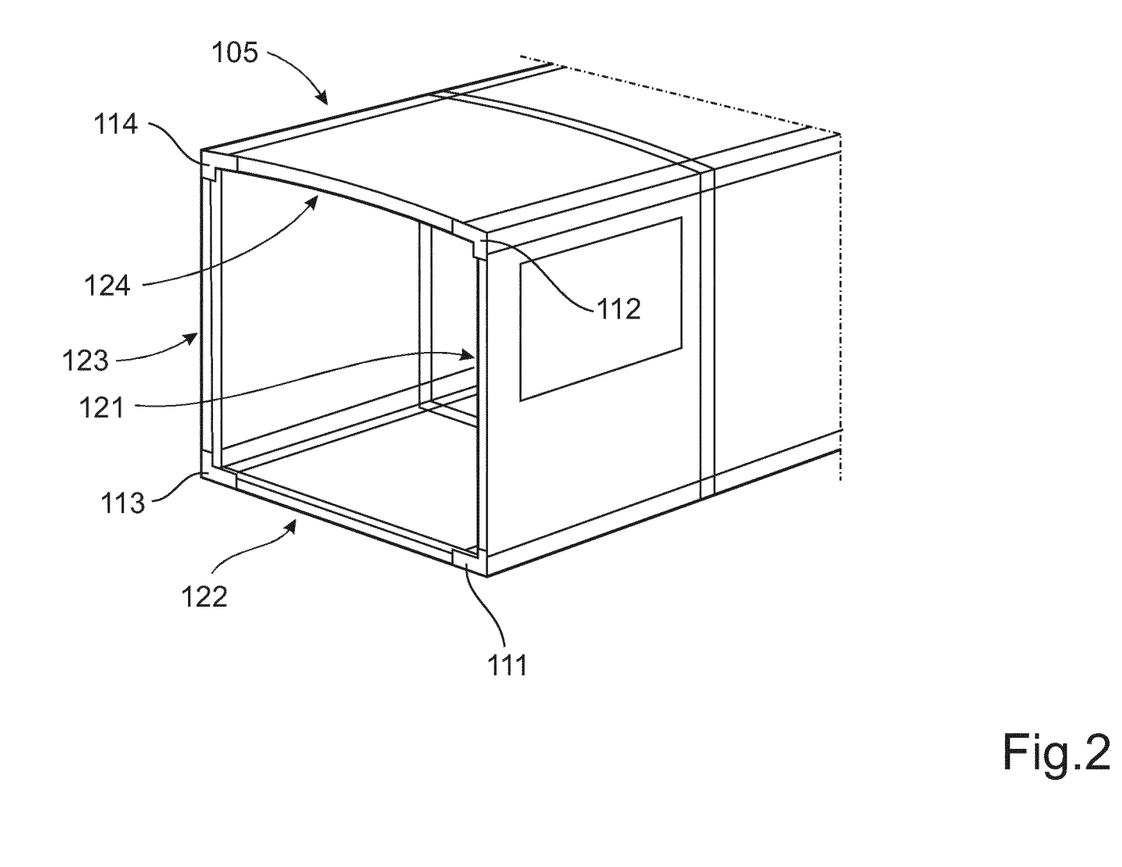
FIG. 2 shows a schematic perspective view of body elements assembled using connecting joints according to the invention.

FIG. 2 shows a schematic perspective view of body elements making up a body module, which body elements are assembled using connecting joints according to the invention. In this example, a body module 105 is made up of multiple body elements 121, 122, 123, 124 in the form of two facing side elements 121, 123, a floor element 122 and a roof element 124. Adjacent body elements are joined by connecting joint 111, 112, 113, 114 along each corner of the body module 105 in the longitudinal direction of the body module.

Figure 3:
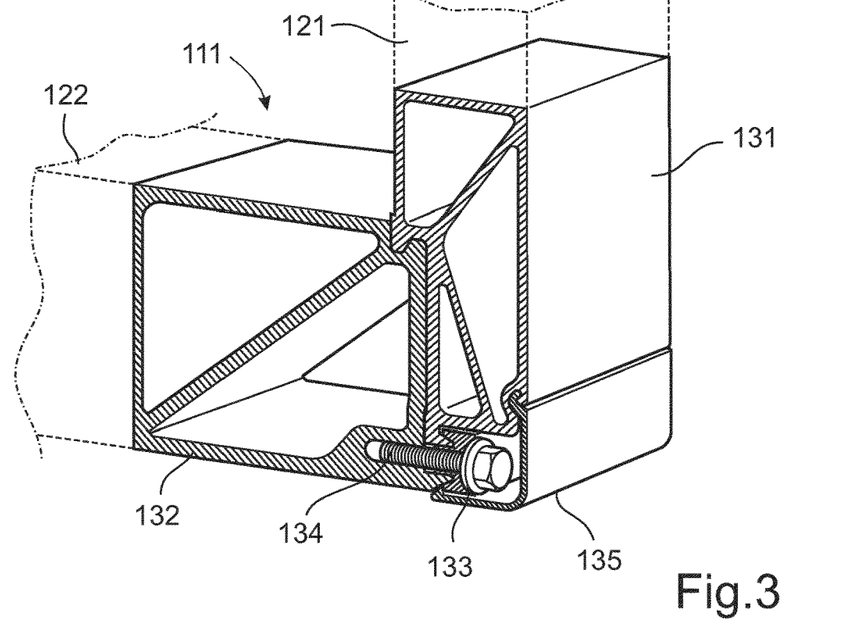
FIG. 3 shows a perspective view of a cross-section through a connecting joint according to the invention.

FIG. 3 shows a perspective view of a cross-section through a connecting joint according to the invention. The figure shows a side element 121 and a floor element 122 (indicated in dashed lines) as shown in FIG. 2, which body elements 121, 122 are assembled by a connecting joint 111. The connecting joint 111 comprises first elongate profile 131 attached along an adjacent edge of the first body element 121 and a second elongate profile 132 attached along an adjacent edge of the second body element 122. The first and second elongate profiles 131, 132 are connected by means of form-fitting mating surfaces and a pair of dovetail sections on the respective first and second elongate profiles, which arrangement will be described in further detail below. The first and second elongate profiles 131, 132 are clamped together by a fastening strip 133 having a profile arranged to contact the dovetail sections, which fastening strip 133 is attached by means of fasteners 134 (one shown) extending into holes or a recess in the second elongate profile 132 and arranged to press the fastening strip 133 towards the dovetail sections. The fastening strip 133 and any fasteners 134 can be enclosed by an optional cover profile 135 extending along the first and second elongate profiles 131, 132. When the body elements 121, 122 and the connecting joint 111 form an integral part of the outer skin of a body module, then the substantially L-shaped cover profile 135 can be provided to protect the connecting joint 111 from physical damage as well as from dirt and humid conditions. If the body elements 121, 122 and the connecting joint 111 are instead covered by an outer protective skin, then the cover profile 135 can be dispensed with.

Figure 4:
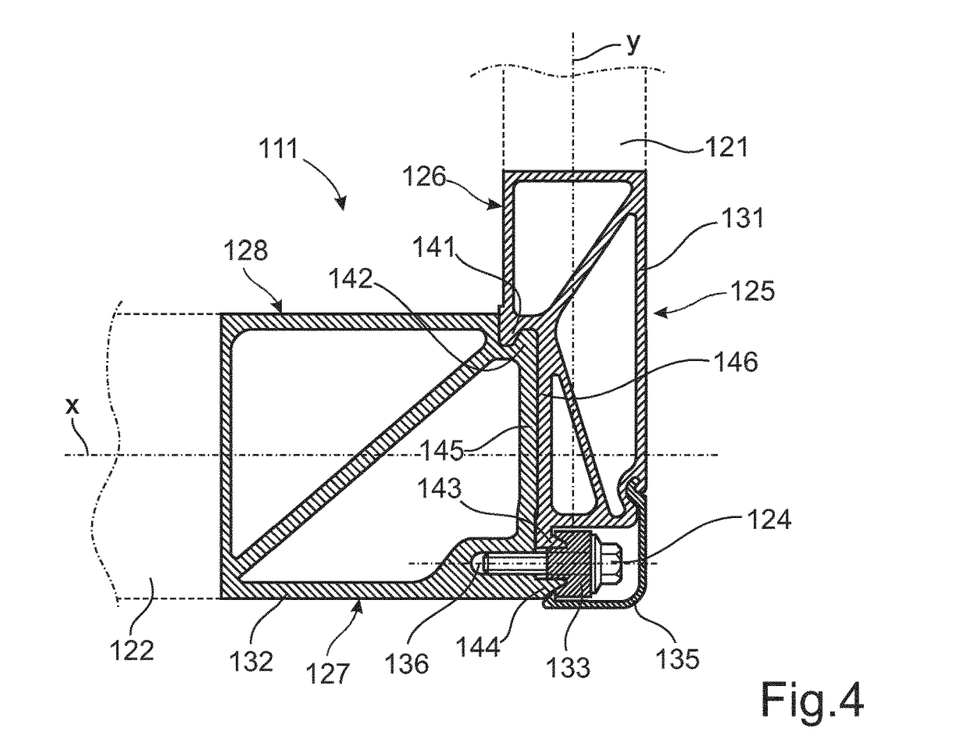
FIG. 4 shows a cross-section through a connecting joint according to the invention.

FIG. 4 shows a cross-section through the connecting joint 111 in FIG. 3. The figure shows the assembled connecting joint 111 comprising a first elongate profile 131 attached to a second elongate profile 132. The side element 121 and the floor element 122 are indicated in dashed lines, and the transverse extensions of these body elements 121, 122 are indicated by dash-dotted lines X and Y, respectively. As defined above, the transverse extension of the respective body element is at right angles to their longitudinal extension in the longitudinal direction of the vehicle. The transverse extension of the respective elongate profile is at right angles to their longitudinal extension and in the plane of their respective adjacent body element. The connecting joint 111 forms a corner joint, wherein the side element 121 and the first elongate profile 131 have an outer side surface 126, facing away from the second elongate profile 132, and an inner side surface 126 facing the second elongate profile 132. Similarly, the floor element 122 and the second elongate profile 132 have an outer side surface 127, facing away from the first elongate profile 131, and an inner side surface 128 facing the first elongate profile 131.

As indicated above, the first and second elongate profiles 131, 132 are connected by means of form-fitting mating surfaces. The form-fitting surfaces comprise a first projection 141 protruding from the first elongate profile 131 and a first recess 142 arranged in a side surface of the second elongate profile 132. The form-fitting surfaces on the first projection 141 and the first recess 142 comprise complementary beveled surfaces. The first projection 141 protrudes from the first elongate profile 131 remote from its free end and extends parallel to a side surface 125, 126 of the first elongate profile 131 towards the free end of the first elongate profile 131, The free end of the first elongate profile faces away from the first body element 121 to which the first elongate profile is attached. The first recess 142 is arranged in the inner side surface 128 of the second elongate profile 132 and arranged parallel to the free end of the second elongate profile. The free end of the second elongate profile faces away from the second body element 122 to which the second elongate profile is attached. During assembly, the first projection 141 is inserted into the first recess 142, as will be described in further detail below.

The first and second elongate profiles 131, 132 are further connected by means of a pair of dovetail sections on the respective first and second elongate profiles 131, 132. The first and second elongate profiles 131, 132 are clamped together by a fastening strip 133 attached by parallel fasteners 134 (one shown) extending into the second elongate profile 132. A first dovetail section 143 protrudes from the first elongate profiles 131 and is arranged along the end surface at the free end of the first elongate profile 131. The first dovetail section 143 has an angled first contact surface (see FIG. 5) arranged to face the first elongate profile 131. The first contact surface is located in a plane arranged to intersect a plane through the axes of the fasteners 134 at an acute angle remote from the second elongate profile 132. A second dovetail section 144 protrudes from the second elongate profile 132 and extends parallel to and out of the free end along an edge of the second elongate profile 132. The second dovetail section 144 has an angled second contact surface (see FIG. 5) arranged to face away from the first elongate profile 131. The second contact surface is located in a plane arranged to intersect a plane through the axes of the fasteners 134 at an acute angle remote from the second elongate profile 132.

The first and second elongated profiles 131, 132 are joined along facing contact surfaces 145, 146, respectively, wherein a first contact surface 145 extends parallel to the side surface 126 along the first elongate profile 131 and a second contact surface 146 comprises an end surface along the second elongate profile 132, which end surface faces the first elongate profile 131. In this example, the first contact surface 145 is parallel to and recessed a predetermined distance into the side surface 126 of the first elongate profile 131. This arrangement provides a step along the side surface of the first elongate profile 131 in which step the free end of the second elongate profile 132. The recessed distance into the side surface 126 of the first elongate profile 131 is selected to allow contact between the complementary beveled surfaces on the first projection 141 and the first recess 142. The width of the recessed contact surface 145, measured in the transverse extension Y away from the free end of the first elongate profile 131, is less than the thickness of the second elongate profile 132 but greater than the width of the second contact surface 146, measured parallel to said second contact surface 146. In the example shown in FIG. 4, the first projection 141 and the first recess 142 are separated from the first and second dovetail sections 143, 144, respectively, by the facing contact surfaces 145, 146 between the first and second elongated profiles 131, 132. Further, the first projection 141 and the first recess 142 are located on the opposite side of a plane coinciding with the assembled contact surfaces 145, 146 relative to the first and second dovetail sections 143, 144. This plane is located parallel to the transverse extension Y of the first elongate profile 131. In addition, the fasteners clamping the first and second elongated profiles 131, 132 together are arranged with their axes at right angles to the facing contact surfaces 145, 146 between the profiles.

The fastening strip 133 has a cross-sectional profile arranged to contact the angled first and second contact surfaces of the first dovetail section and the second dovetail section, respectively. Matching angled contact surfaces on the fastening strip 133 causes the first and second elongate profiles to be clamped to each other along their adjacent ends under the action of the fasteners 134. The fastening strip 133 is attached by means of fasteners 134 extending into the second elongate profile 132 in the direction of its transverse extension X, at right angles to the transverse extension Y of the first elongate profile 131. Under the action of the fasteners 134, the first and second elongate profiles 131, 132 are clamped together by the fastening strip 133 contacting the dovetail sections, which fasteners 134 extend into holes or a recess 136 in the second elongate profile 132 as they are tightened. According to a preferred embodiment, the fasteners are self-threading, or tapping screws which are fastened into a longitudinal recess or slot in the end surface of the second elongate profile. Alternatively, tapping or threaded screws can be fastened into pre-drilled holes. At the same time the angled contact surfaces on the fastening strip 133 are arranged to be pressed towards the angled contact surfaces on the dovetail sections, drawing the dovetail sections together and causing the complementary beveled surfaces on the first projection 141 and the first recess 142 to be forced together to create an interlocking connection joint 111. The example in FIG. 4 also shows the optional cover profile 135 enclosing the fastening strip 133 and the fasteners 134.

FIGS. 5-8 show an assembly process for a connecting joint according to the invention. For reasons of clarity, the body elements are not shown in these figures. Most of the reference numbers used to indicate component parts in the subsequent figures have been defined in connection with the description of FIGS. 3 and 4.

Figure 5:
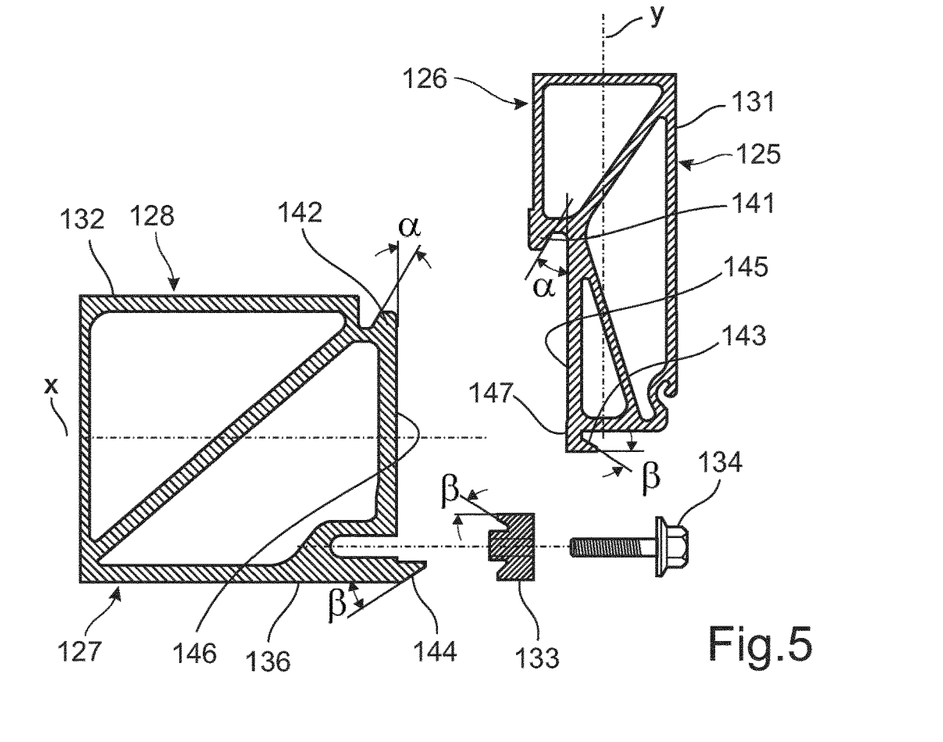
FIGS. 5-8 show an assembly process for a connecting joint according to the invention.

FIG. 5 shows an exploded view of the first and second elongate profiles 131, 132, prior to assembly. FIG. 5 indicates the first projection 141 and the first recess 142 and their complementary beveled surfaces. A first beveled surface on the first projection 141 faces away from the second contact surface 146 at the free end of the second elongate profile 132 and is arranged at an angle α relative to the adjacent first contact surface 145 on the first elongate profile 131. Similarly, a second beveled surface on the first recess 142 faces away from the first contact surface 145 in the recessed side surface of the first elongate profile 131 and is arranged at an angle α relative to the adjacent second contact surface 146 on the second elongate profile 132. Both complementary beveled surfaces are arranged at the same angle α in order to facilitate force distribution and to avoid point or line contact between the projection and the recess.

The example in FIG. 5 shows an advantageous design for the first contact surface 145 and the corresponding second contact surface 146. Along its lower edge, the first contact surface 145 can be provided with a raised, third contact surface 147. In this way, the first and second elongate profiles 131, 132 are in contact at the upper portions of the first and second contact surfaces 145, 146, adjacent the first and second projections 141, 142, and at the lower portions of the first and second contact surfaces 145, 146, along the third contact surface 147. This design is advantageous in view of the manufacturing tolerances of the extruded first and second elongate profiles 131, 132. The third contact surface 147 creates a gap between the upper and lower portions of the first and second contact surfaces 145, 146. This gap can take up minor variations in surface quality between the first and second contact surfaces and ensures correct assembly of the first and second elongate profiles 131, 132.

FIG. 5 further indicates the angled first contact surface of the first dovetail section 143, which contact surface faces the first elongate profile 131. The first contact surface of the first dovetail section 143 is located in a plane arranged to intersect a plane through the axes of the fasteners 134 at an acute angle β remote from the second elongate profile 132. The second dovetail section 144 has an angled second contact surface arranged to face away from the first elongate profile 131. The second contact surface is located in a plane arranged to intersect a plane through the axes of the fasteners 134 at an acute angle β remote from the second elongate profile 132. The fastening strip 133 is arranged to be clamped to the contact surfaces of the first and second dovetail sections 143, 144 of the first and second elongate profiles 131, 132. Consequently, the fastening strip 133 is provided with matching angled contact surfaces at the same angle β relative to a plane through the axes of the fasteners 134. The contact surfaces for the dovetail sections and the fastening strip are arranged at the same angle β in order to facilitate force distribution and to avoid point or line contact between the projection and the recess.

Figure 6:
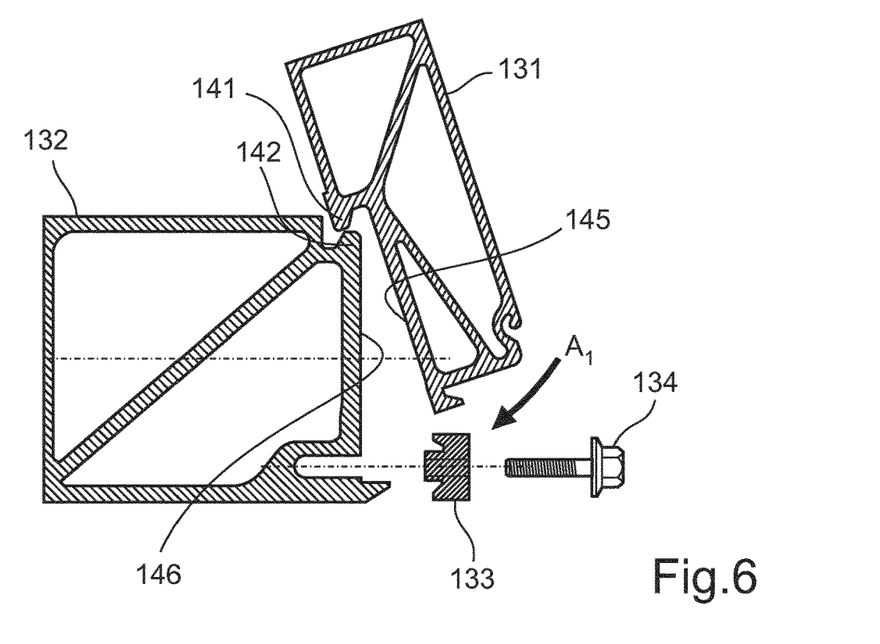

FIG. 6 shows a first step of the assembly process for the first and second elongate profiles 131, 132 and their attached body elements (not shown). During assembly, the free end of the first elongate profiles 131 is initially angled away from the free end of the second elongate profile 132. The first projection 141 of the first elongate profile 131 is then inserted into the first recess 142 of the second elongate profile 132. The first projection 141 and the first recess 142 are then hooked together by angling free end of the first elongate profiles 131 into contact with the second elongate profile 132, as indicated by the arrow A1.

Figure 7:
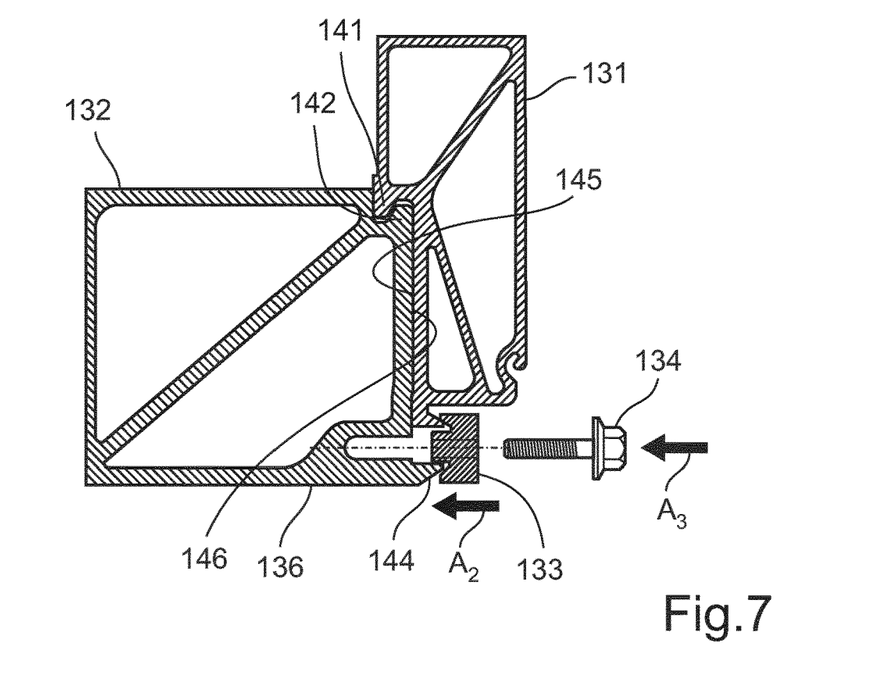

FIG. 7 shows a second step of the assembly process, wherein the fastening strip 133 is placed in contact with the first and second dovetail sections 143, 144, as indicated by the arrow A2. Subsequently, the fasteners 134 are positioned in through holes (not shown) in the fastening strip 133 prior to tightening, as indicated by the arrow A3. At this time the first projection 141 and the first recess 142 are in position relative to each other, but not necessarily in contact.

Figure 8:
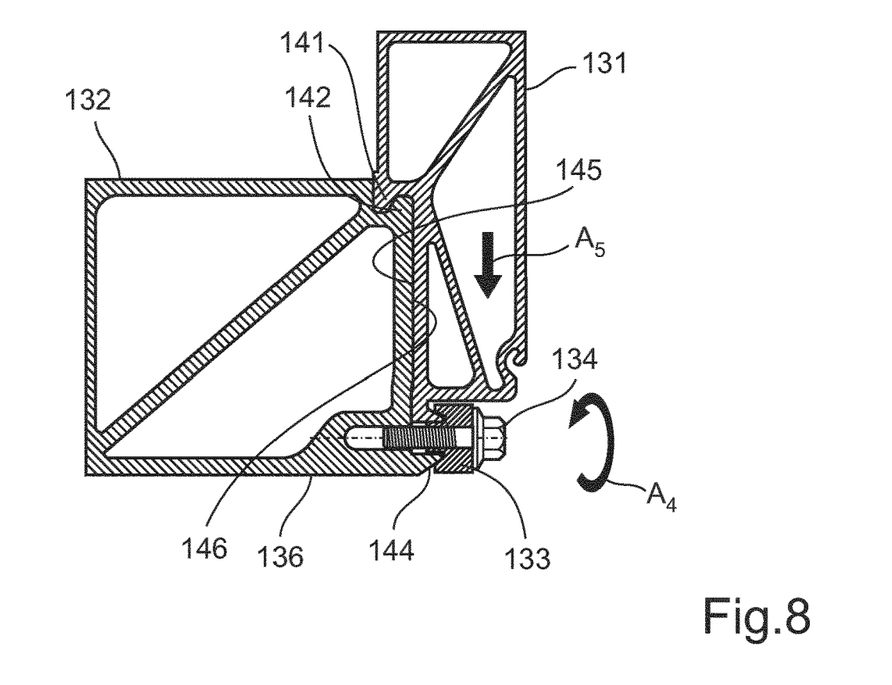

FIG. 8 shows a third step of the assembly process, wherein fasteners 134 in the form of tapping screws are fastened into a longitudinal recess or slot 136 in the end surface of the second elongate profile 132, as indicated by the arrow A4. Tightening of the fasteners 134 causes the fastening strip 133 to be pressed towards the angled contact surfaces on the dovetail sections 143, 144, whereby the dovetail sections are drawn together. The first elongate profile 131 will then be displaced along the second contact surface 146 causing the complementary beveled surfaces on the first projection 141 and the first recess 142 to be forced together to create an interlocking connection joint 111.

Figure 9:
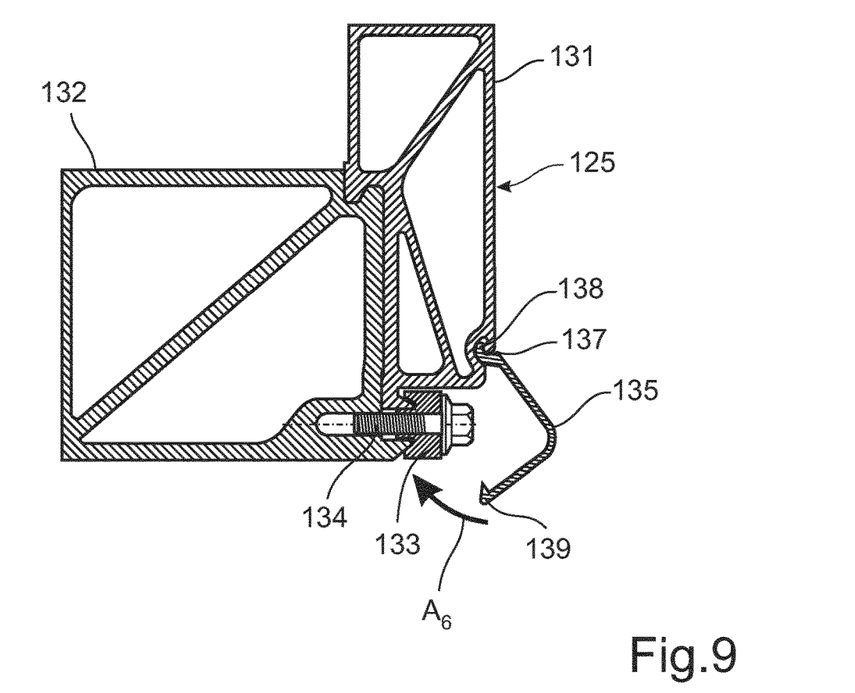
FIGS. 9-10 show the assembly process for an optional cover profile for a connecting joint according to the invention.
Figure 10:
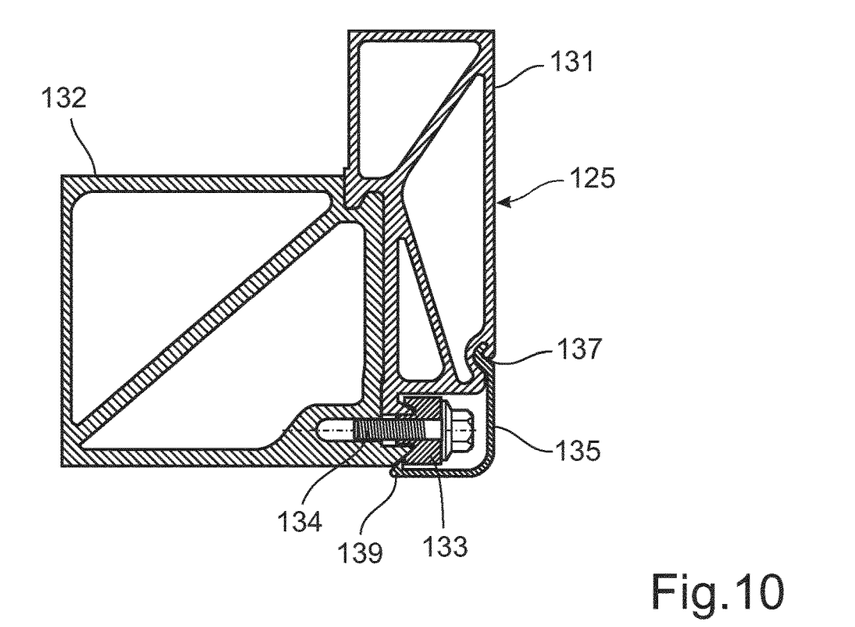

FIGS. 9-10 show the assembly process for an optional cover profile 135 for a connecting joint according to the invention. As shown in FIG. 9, the fastening strip 133 and any fasteners 134 can be enclosed by an optional cover profile 135 extending along the first and second elongate profiles 131, 132. The cover profile 135 has a substantially L-shaped cross-section. Along a first free end the cover profile 135 is provided with a curved attachment section 137, which is inserted into a similarly curved slot 138 in the outer side surface 125 adjacent the free end of the first elongate profile 131, as indicated in FIG. 9. Along a second free end the cover profile 135 is provided with a hook-shaped locking section 139. When the curved attachment section 137 has been inserted in the curved slot 138, the cover profile 135 is rotated about a pivot axis created by the curved slot 138 as indicated by the arrow A6. In a final step, the cover profile 135 is fixed into position by snapping the locking section 139 over an edge of fastening strip 133 remote from the free end of the first elongate profile 131 as shown in FIG. 10. The substantially L-shaped cover profile 135 can be provided to protect the connecting joint 111 from physical damage as well as from dirt and humid conditions. This is an advantage when the body elements 121, 122 and the connecting joint 111 form an integral part of the outer skin of a body module.

The invention should not be deemed to be limited to the embodiments described above, but rather a number of further variants and modifications are conceivable within the scope of the following patent claims.

The invention claimed is:

1. A vehicle body element connecting joint for connecting a first body element to a second body element, comprising:
   first and second elongate profiles arranged along adjacent edges of the first and second body elements, respectively;
   a first projection protruding from the first elongate profile parallel to a side surface of the first elongate profile and extending towards a free end of the first elongate profile,
   a first recess arranged in a side surface of the second elongate profile and arranged parallel to an edge of the second elongate profile, wherein the first projection is inserted into the first recess;
   a first dovetail section protruding from the first elongate profile and arranged along the free end of the first elongate profile,
   a second dovetail section protruding from the second elongate profile and extending parallel to and out of the free end of the second elongate profile,
   at least one fastening strip having a profile arranged to contact the first dovetail section and the second dovetail section in order to clamp the first and second elongate profiles to each other along their adjacent free ends, and
   at least one fastener arranged to press the fastening strip towards the first dovetail section and the second dovetail section in order to achieve a clamping force when the joint is tightened by the fastener.

2. The connecting joint of claim 1, wherein the first and second elongated profiles are joined along facing contact surfaces, wherein a first contact surface extends parallel to the side surface along the first elongate profile and a second contact surface comprises an end surface along the second elongate profile facing the first elongate profile.

3. The connecting joint of claim 2, wherein the first projection and the first recess are separated from the first and second dovetail sections, respectively, by the facing contact surfaces between the first and second elongated profiles.

4. The connecting joint of claim 2, wherein the first projection and the first recess are located on the opposite side of a plane coinciding with the assembled contact surfaces relative to the first and second dovetail sections.

5. The connecting joint of claim 2, wherein the fastener is arranged at right angles to the facing contact surfaces between the first and second elongated profiles.

6. The connecting joint of claim 1, wherein the first projection and the first recess comprise complementary beveled surfaces arranged to force the first and second elongated profiles together when the joint is tightened with the fastener.

7. The connecting joint of claim 2, wherein the fastener is arranged to be threaded into a recess in an end surface of the second elongate profile through the fastening strip in order to press the fastening strip towards the first and second dovetail sections.

8. The connecting joint of claim 2, wherein the fastener is a tapping screw arranged to be threaded into a longitudinal slot along an end surface of the second elongate profile.

9. The connecting joint of claim 1, wherein the contacting portions of the first and second elongated profiles form a corner joint, along which the first and second body elements are connected.

10. The connecting joint of claim 1, wherein the fastening strip and the at least one fastener are covered by an elongated cover profile hooked into a recess in the first elongated profile and snapped over a side edge of the fastening strip.

11. A vehicle, comprising:
a first body element;
a second body element; and
a body element connecting joint for connecting the first body element to the second body element, comprising:
first and second elongate profiles arranged along adjacent edges of the first and second body elements, respectively;
a first projection protruding from the first elongate profile parallel to a side surface of the first elongate profile and extending towards a free end of the first elongate profile,
a first recess arranged in a side surface of the second elongate profile and arranged parallel to an edge of the second elongate profile, wherein the first projection is inserted into the first recess;
a first dovetail section protruding from the first elongate profile and arranged along the free end of the first elongate profile,
a second dovetail section protruding from the second elongate profile and extending parallel to and out of the free end of the second elongate profile,
at least one fastening strip having a profile arranged to contact the first dovetail section and the second dovetail section in order to clamp the first and second elongate profiles to each other along their adjacent free ends, and
at least one fastener arranged to press the fastening strip towards the first dovetail section and the second dovetail section in order to achieve a clamping force when the joint is tightened by the fastener.

* * * * *